Patented June 19, 1934

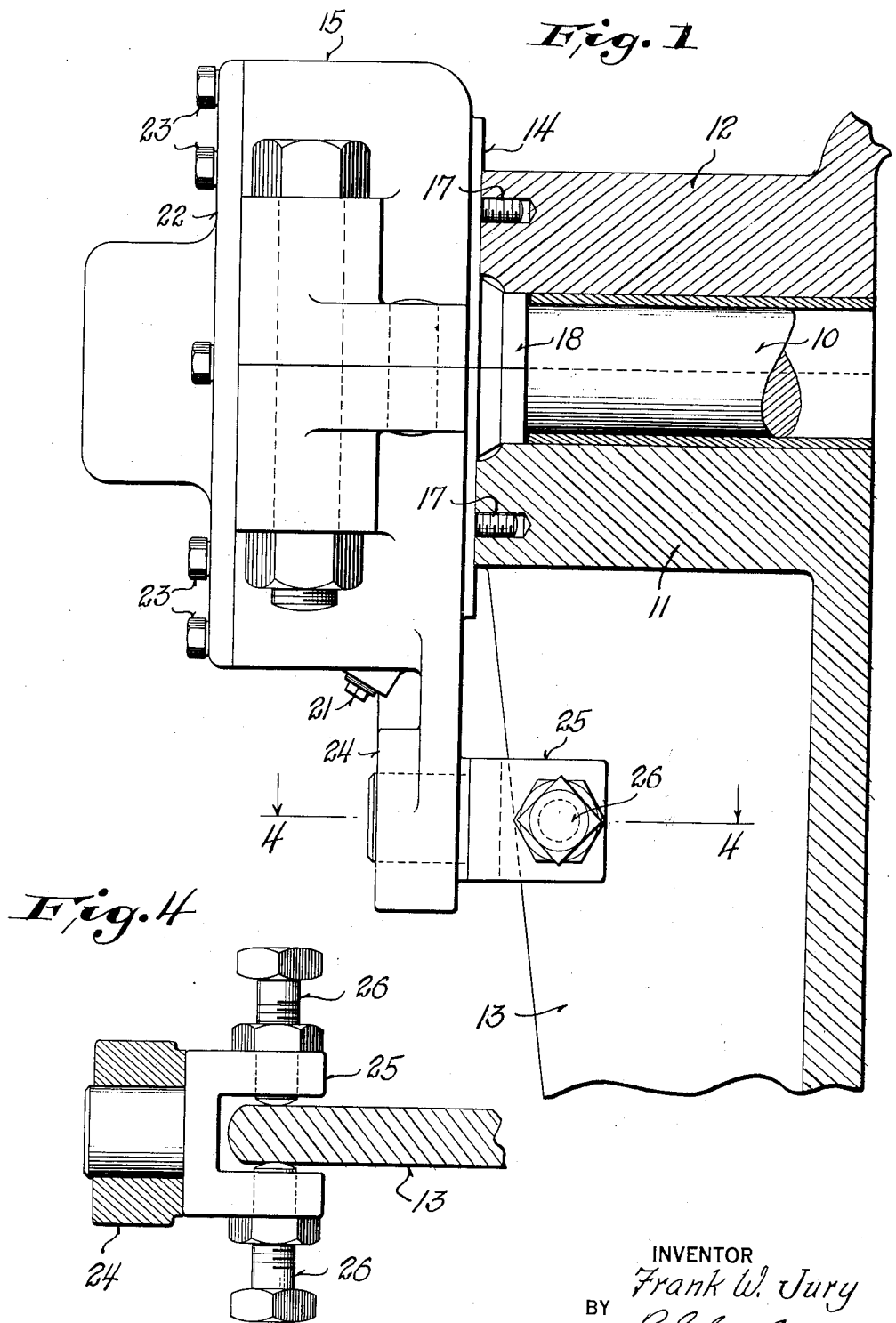

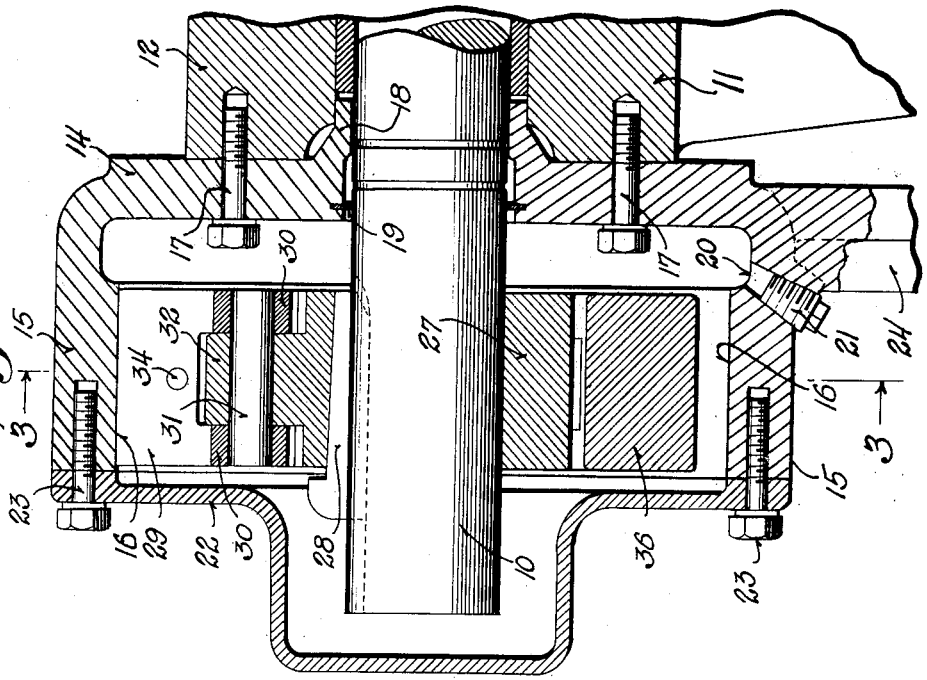
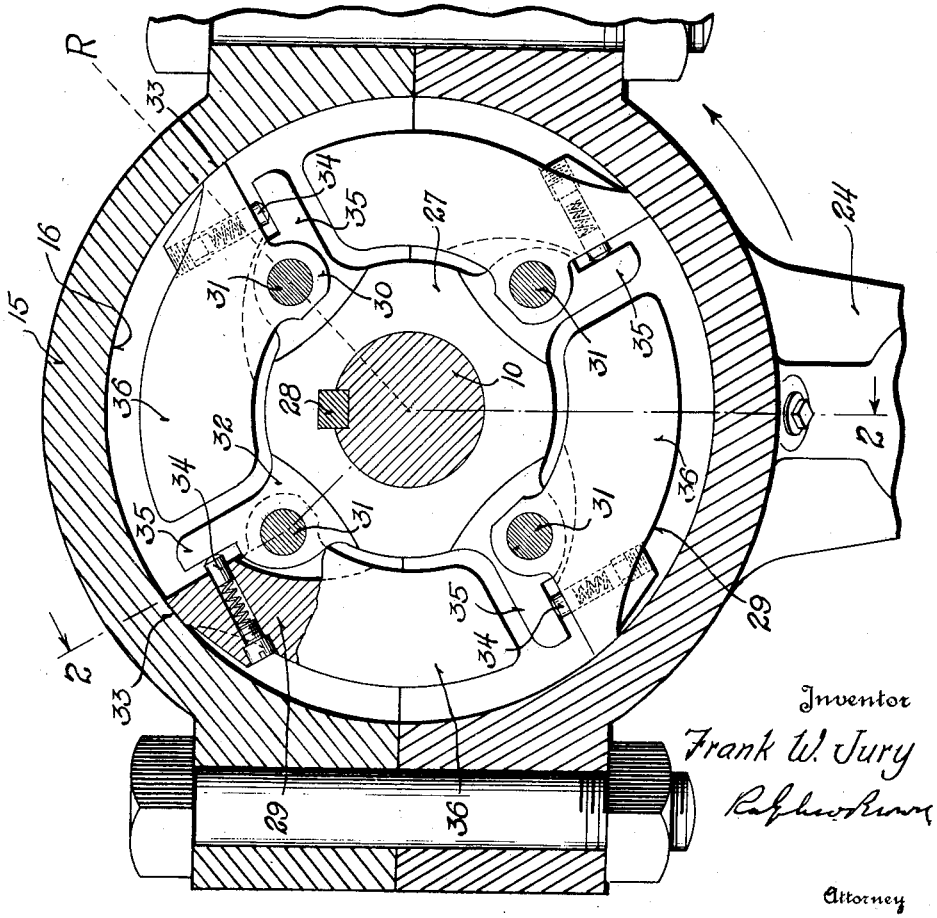

1,963,466

UNITED STATES PATENT OFFICE 1,963,466

BACKSTOP MECHANISM FOR ELEVATORS

Frank W. Jury, Milwaukee, Wis., assignor to The Falk Corporation, Milwaukee, Wis., a corporation of Wisconsin Application August 18, 1931, Serial No. 557,843

8 Claims. (Cl. 188—81)

This invention relates to back-stop mechanisms for elevator drives.

Such mechanisms comprise an automatic one-way brake or ratchet, connected with a shaft forming a part of the elevator drive, and automatically operable to resist reverse operation of the elevator and thereby sustain or support the elevator leg against lowering whenever the power is off, but to permit free operation of the elevator in the other direction for hoisting.

Back-stops heretofore used ordinarily require or permit some reverse elevator movement before becoming effective and the abrupt arresting of this movement, when they do become effective, subjects the entire mechanism to severe shocks and stresses and consequent undue wear.

One object of the present invention is the provision of an improved backstop mechanism which shall overcome the above objection.

Another object is the provision of an improved one-way brake for a shaft which will function automatically to completely release the shaft for rotation in one direction and to immediately assume a holding position, effective as against reverse rotation, whenever the shaft comes to rest.

Another object is the provision of an automatic one-way brake of simple rugged construction and positive and reliable in action.

Another object is the provision of an automatic one-way brake so constructed and arranged as to facilitate its application to and removal from elevator drives or the like, and to afford ready access to those parts thereof which are subjected to wear for purposes of inspection, replacement and repair.

Other objects and advantages will appear from the following description of an illustrative embodiment of the present invention.

In the accompanying drawings:—

Fig. 1 is a view in side elevation of a backstop mechanism constructed in accordance with the present invention and showing the same applied to an elevator drive.

Fig. 2 is a section taken on the line 2—2 of Fig. 3.

Fig. 3 is a sectional view on the line 3—3 of Fig. 2.

Figure 4 is a sectional view on the line 4—4 of Fig. 1.

The brake selected for illustration is shown applied over the projecting end of a drive shaft 10, journalled in a bearing hub 11 which is horizontally split in a well known manner to provide a removable cover portion 12. The bearing hub is reinforced by a vertical web 13 formed integral with the base thereof.

The brake shown comprises a circular housing having an end wall 14 for application to the end of the hub 11, and a relatively wide peripheral wall 15 formed integral with the end wall and providing a brake-ring having an internal braking surface 16. The housing is fixed to the end of the bearing hub 11 by appropriate means, such as screws 17, and is preferably horizontally split, as indicated in Figs. 1 and 3 to permit removal of the upper half thereof with the bearing cover 12.

The housing is also preferably provided with a central external flange 18 adapted to seat snugly within the end of the bearing hub 11 to center the housing and to securely retain the same in concentric relation with respect to the bearing hub. The flange 18 also provides an extended bearing for the shaft 10, the inner end of the bore thereof being enlarged and equipped with a packing ring or baffle 19 to discourage the admission of oil to the housing via the shaft 10. An internal peripheral groove 20 within the housing serves as an oil trap to prevent the admission of oil to the braking surface 16, and a drain plug 21 permits occasional withdrawal of accumulations of oil therefrom. The housing is closed by an appropriate end cap 22 removably fixed thereto by appropriate means such as screws 23.

The lower half of the brake housing carries a depending torque arm 24 preferably formed integral therewith and which coacts with the vertical web 13 to securely anchor the housing against rotation. In this instance the arm carries a bifurcated fitting 25 which straddles the web 13 and which carries a pair of opposed set screws 26 in engagement with the opposite faces of the web and by which the arm 24 is securely locked to the web. The severe torque stresses imposed upon the brake housing as a result of the braking action are thus sustained largely by the torque arm 24 and web 13, and the screws 17 are thus relieved of the tremendous shearing stresses to which they would otherwise be subjected as a result of the braking action.

The brake mechanism shown also comprises a hub 27, fixed to the shaft 10 preferably by a tapered key 28, and carrying a plurality of symmetrically arranged brake shoes 29 rockably mounted thereon. In this instance each brake shoe 29 is provided with a pair of spaced mounting ears 30 rockably supported upon the opposite ends of a heavy pivot pin 31 mounted in an intermediate lug 32 projecting from the periphery of the hub 27.

Each brake shoe is further equipped with a relatively narrow laterally extended face 33 for frictional engagement with the internal braking surface 16 of the brake ring. Each face 33 is curved to match the curvature of the surface 16, so as to effect full face-to-face contact therewith, and so disposed as to contact with the surface 16 over a limited area only slightly offset from that radius R of the brake ring which passes through the pivot pin 31 of the brake shoe (see Fig. 3). I have found that best results are obtainable when this contact area is disposed immediately adjacent the radius R and when it subtends an arc of fourteen degrees about the axis of the pin 31, and that although this angle may be slightly increased or decreased without greatly impairing the function of the device, yet an angle greater than twenty degrees will render the functioning unreliable or wholly ineffective.

Appropriate means, such as a spring loaded plunger 34 mounted in each brake shoe and pressing against a stop 35 on the lug 32, yieldably urges each brake shoe in such direction as to hold the face 33 thereof in contact with the surface 16 when the shaft 10 is at rest. Each brake shoe is also equipped with a counterweight in the form of an extension 36 which, during rotation of the shaft 10, acts by centrifugal force to swing the face 33 clear of the surface 16, to thereby permit the shaft to rotate freely and to elminate friction therebetween.

The arrangement is such that when the shaft 10 is at rest, faces 33 of all of the shoes 29 are held by the plungers 34 in engagement with the internal surface 16 of the brake ring, so as to effectively resist clockwise rotation of the shaft (Fig. 3). In this connection it will be noted that, due to the narrowness of the faces 33 and to the sight angle between each and the radius R of the brake ring, any attempted rotation of the shaft in a clockwise direction will at once produce a wedging or jamming action of the shoes between the surface 16 and the pivot pins 31, so as to greatly increase the holding pressure between the faces 33 and the surface 16. The shoes are thus effective to securely lock the shaft against any clockwise rotation. The pressure between the faces 33 and surface 16 is immediately relieved, however, upon rotation of the shaft in the opposite direction, and as the speed of the shaft increases the centrifugal action of the weights 36 causes the several shoes to rock in such direction as to withdraw the faces 33 from the surface 16. When the shaft again comes to rest, the faces 33 are promptly returned into frictional engagement with the surface 16 by the action of the plungers 34, and the brake thus automatically assumes a position to effectively and securely hold the shaft against clockwise rotation.

Various changes may be made in the embodiment of the invention hereinabove specifically described without departing from the invention as defined in the appended claims.

I claim:—

1. In a device of the character described the combination of a stationary ring having an internal braking surface, a rotatable carrier disposed concentrically of said ring, a plurality of brake shoes pivotally mounted on said carrier, each of said shoes having a narrow face for frictional engagement with said surface over a narrow area immediately adjacent a radius of said ring passing through the pivotal axis of the shoe, said area being confined within an arc of twenty-five degrees about said pivotal axis, and means for yieldably pressing said faces into contact with said surface when said carrier is at rest to thereby hold said carrier against rotation in one direction, said shoes being ineffective to prevent rotation of said carrier in the opposite direction, and centrifugal means for withdrawing said faces from contact with said surface during rotation in the direction last named.

2. In a device of the character described the combination of a stationary ring having an internal braking surface, a rotatable carrier disposed concentrically of said ring, and a plurality of brake shoes pivotally mounted on said carrier, each of said brake shoes having a narrow face for frictional engagement with said surface over a narrow area immediately adjacent a radius of said ring passing through the pivotal axis of the shoe, said area being confined within an arc of twenty-five degrees about said pivotal axis, and means for urging said faces into contact with said surface when said carrier is at rest to thereby hold said carrier against rotation in one direction, said shoes being ineffective to prevent rotation of said carrier in the opposite direction and responsive to rotation in said last named direction to withdraw said faces from contact with said surface.

3. In a device of the character described the combination of a stationary ring having an internal braking surface, a rotatable carrier disposed concentrically of said ring, and a plurality of brake shoes pivotally mounted on said carrier, each of said shoes having a narrow face for frictional engagement with said surface over a narrow area immediately adjacent a radius of said ring passing through the pivotal axis of the shoe, said area being confined within an arc of twenty five degrees about said pivotal axis, whereby said carrier is securely held against rotation in one direction by a binding pressure between said shoes and ring, said shoes being rockable in response to rotation of said carrier in the opposite direction to release said pressure and to thereby permit free rotation of said carrier in the direction last named.

4. In a device of the character described the combination of a stationary ring having a braking surface, a rotatable carrier disposed concentrically of said ring, and a plurality of brake shoes pivotally mounted on said carrier, each of said shoes having a narrow face for frictional engagement with said surface over a narrow area immediately adjacent a radius of said ring passing through the pivotal axis of the shoe, said area being confined within an arc of twenty five degrees about said pivotal axis, whereby said carrier is securely held against rotation in one direction by a binding pressure between said shoes and ring, said shoes being rockable in response to rotation of said carrier in the opposite direction to release said pressure and to thereby permit free rotation of said carrier in the direction last named.

5. The combination of a ring having an uninterrupted peripheral surface, a carrier rotatable about an axis substantially concentric with said ring, a plurality of shoes pivotally mounted on said carrier, each of said shoes having a narrow face for frictional engagement with said surface over a narrow area immediately adjacent a radius of said ring passing through the pivotal axis of the shoe, said area being confined within an arc of twenty five degrees about said pivotal axis, thereby to prevent relative rotation between said carrier and ring in one direction by a binding pressure between said shoes and ring, said shoes being rockable in response to relative rotation in the opposite direction to release said pressure and thereby permit free relative rotation in the direction last named.

6. A one-way brake for application to a bearing support having a shaft projecting therefrom, said brake comprising a housing for application to said support and having an opening therein for receiving said shaft, a flange surrounding said opening and engageable with said support to center the housing thereon, an arm projecting from said housing and engageable with said support to prevent rotation of said housing, said housing having an internal braking surface, a carrier, means for securing said carrier to said shaft, and means on said carrier coacting with said surface to hold said shaft against rotation in one direction and automatically releasable to permit free rotation in the opposite direction.

7. A one-way brake for application to a bearing support having a shaft projecting therefrom and also having a reinforcing web, said brake comprising a housing having an internal braking surface and also having a central opening to receive said shaft, means for securing said housing to said support including means projecting from one side thereof and engageable with said web to prevent rotation of said housing, and means for application to said shaft and coacting with said surface to hold said shaft against rotation in one direction and automatically releasable to permit free rotation in the opposite direction.

8. A one-way brake for application to a split bearing support having a removable cover portion and also having a shaft projecting therefrom, said brake comprising a housing for application to said support, means for securing said housing to said support, said housing being split to permit removal of a portion thereof with the cover portion of said bearing support, said housing having a central opening to receive said shaft and a flange surrounding said opening and engageable within said bearing support, an arm projecting from said housing and engageable with said support to secure said housing against rotation, said housing having an internal braking surface, and means for application to said shaft and coacting with said surface to hold said shaft against rotation in one direction and automatically releasable to permit free rotation in the opposite direction.

FRANK W. JURY.